US012417724B2

(12) United States Patent
Lee et al.

(10) Patent No.: US 12,417,724 B2
(45) Date of Patent: Sep. 16, 2025

(54) ELECTRONIC DEVICE CONTROLLING PULSE SIGNAL FROM PROCESSOR TO DISPLAY

(71) Applicant: Samsung Electronics Co., Ltd., Suwon-si (KR)

(72) Inventors: Jaesung Lee, Suwon-si (KR); Kyounghwan Kwon, Suwon-si (KR); Jongkon Bae, Suwon-si (KR); Donghwy Kim, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/488,294

(22) Filed: Oct. 17, 2023

(65) Prior Publication Data

US 2024/0112609 A1 Apr. 4, 2024

Related U.S. Application Data

(63) Continuation of application No. PCT/KR2023/014940, filed on Sep. 26, 2023.

(30) Foreign Application Priority Data

Sep. 30, 2022 (KR) ........................ 10-2022-0125365
Jan. 4, 2023 (KR) ........................ 10-2023-0001471
(Continued)

(51) Int. Cl.
*G09G 3/20* (2006.01)
*G09G 5/12* (2006.01)

(52) U.S. Cl.
CPC ........... *G09G 3/20* (2013.01); *G09G 2230/00* (2013.01); *G09G 2310/0264* (2013.01);
(Continued)

(58) Field of Classification Search
CPC ............................................. G09G 2340/0435
See application file for complete search history.

(56) References Cited

U.S. PATENT DOCUMENTS 5,948,091 A 9/1999 Kerigan et al.
8,289,306 B2 10/2012 Unger
(Continued)

FOREIGN PATENT DOCUMENTS

JP 6742685 B2 7/2020
JP 6909903 B1 7/2021
(Continued)

OTHER PUBLICATIONS

Notice of Allowance issued Aug. 29, 2024 in corresponding U.S. Appl. No. 18/487,669.
(Continued)

*Primary Examiner* — William Boddie
*Assistant Examiner* — Bipin Gyawali
(74) *Attorney, Agent, or Firm* — Nixon & Vanderhye P.C.

(57) ABSTRACT

An electronic device is provided. The electronic device includes a processor. The electronic device includes a display including a display driver circuit and a display panel. The electronic device includes a first path connecting the display driver circuit to the processor. The electronic device includes a second path connecting the display driver circuit to the processor and separate from the first path. The processor is configured to transmit, based on a first cycle, via the second path to the display driver circuit, a pulse signal to synchronize, with a first time period in the processor used to display an image transmitted via the first path to the display driver circuit on the display panel, the first time period in the display driver circuit used to display the image on the display panel. The processor is configured to change, based on a second cycle different from the first cycle, a
(Continued)

waveform of the pulse signal transmitted from the first cycle from a first waveform to a second waveform to synchronize, with a second time period in the processor used for the display of the image, the second time period in the display driver circuit used for the display of the image.

20 Claims, 8 Drawing Sheets

(30) Foreign Application Priority Data

| | | |
|---|---|---|
| Jan. 11, 2023 | (KR) | 10-2023-0004350 |
| Jan. 31, 2023 | (KR) | 10-2023-0013290 |
| Feb. 28, 2023 | (KR) | 10-2023-0026723 |
| Sep. 25, 2023 | (WO) | PCT/KR2023/014711 |

(52) U.S. Cl.
CPC ... *G09G 2310/08* (2013.01); *G09G 2330/021* (2013.01); *G09G 2340/0435* (2013.01)

(56) References Cited

U.S. PATENT DOCUMENTS

| | | | | |
|---|---|---|---|---|
| 8,451,279 | B2 | 5/2013 | Gorla et al. | |
| 8,654,132 | B2 | 2/2014 | Gorla et al. | |
| 9,485,426 | B2 | 11/2016 | Sakamoto et al. | |
| 9,704,215 | B2 | 7/2017 | Kim et al. | |
| 9,830,880 | B1 | 11/2017 | Wyatt | |
| 9,959,589 | B2 | 5/2018 | Bae et al. | |
| 10,096,286 | B2 | 10/2018 | Cho et al. | |
| 10,504,442 | B2 | 12/2019 | Yoo | |
| 10,614,772 | B2 | 4/2020 | Zhao et al. | |
| 10,810,927 | B2 | 10/2020 | Lee et al. | |
| 10,810,943 | B2 | 10/2020 | Yum et al. | |
| 11,270,615 | B2 | 3/2022 | Choi et al. | |
| 11,302,251 | B2 | 4/2022 | Sung et al. | |
| 11,322,079 | B2 | 5/2022 | Wu | |
| 11,380,286 | B2 | 7/2022 | Lee et al. | |
| 11,412,173 | B2 | 8/2022 | Yamamoto et al. | |
| 11,467,692 | B2 | 10/2022 | Kim et al. | |
| 11,514,873 | B1 | 11/2022 | Chen et al. | |
| 11,676,557 | B2 | 6/2023 | Park | |
| 12,062,316 | B2 | 8/2024 | Kim | |
| 2006/0055692 | A1* | 3/2006 | Kuo | G09G 3/3611 345/213 |
| 2010/0053182 | A1 | 3/2010 | Jeon et al. | |
| 2011/0018887 | A1* | 1/2011 | Uchiyama | G09G 5/006 345/545 |
| 2013/0044087 | A1* | 2/2013 | Hsu | G09G 5/003 345/204 |
| 2013/0155036 | A1 | 6/2013 | Kim et al. | |
| 2015/0029201 | A1* | 1/2015 | Cha | G09G 5/12 345/522 |
| 2016/0078846 | A1* | 3/2016 | Liu | G09G 5/18 345/212 |
| 2017/0069256 | A1* | 3/2017 | Seo | G09G 3/3648 |
| 2017/0193971 | A1 | 7/2017 | Bi et al. | |
| 2020/0082760 | A1* | 3/2020 | Ogata | G09G 3/3258 |
| 2020/0092516 | A1 | 3/2020 | Moon et al. | |
| 2022/0189408 | A1 | 6/2022 | Jo et al. | |
| 2023/0156265 | A1 | 5/2023 | Park et al. | |
| 2023/0176689 | A1 | 6/2023 | Lee et al. | |
| 2023/0178116 | A1 | 6/2023 | Kim et al. | |
| 2023/0179824 | A1* | 6/2023 | Kim | H04N 21/43072 345/629 |
| 2023/0306913 | A1* | 9/2023 | Hatayama | G09G 3/3275 |
| 2024/0038135 | A1* | 2/2024 | Kim | G09G 3/3233 |
| 2024/0038157 | A1* | 2/2024 | Lee | G09G 3/3225 |
| 2024/0038172 | A1 | 2/2024 | Sang et al. | |

FOREIGN PATENT DOCUMENTS

| | | | |
|---|---|---|---|
| JP | 7387682 | | 11/2023 |
| KR | 10-2008-0055653 | | 6/2008 |
| KR | 20100025095 | A | 3/2010 |
| KR | 10-1158876 | | 6/2012 |
| KR | 10-2013-0027094 | | 3/2013 |
| KR | 10-2017-0064292 | | 6/2017 |
| KR | 10-2017-0087086 | | 7/2017 |
| KR | 10-1885331 | | 7/2018 |
| KR | 10-2018-0118209 | | 10/2018 |
| KR | 10-2019-0003334 | | 1/2019 |
| KR | 10-2019-0127472 | | 11/2019 |
| KR | 20210017468 | A | 2/2021 |
| KR | 10-2021-0101679 | | 8/2021 |
| KR | 102305765 | B1 | 9/2021 |
| KR | 10-2022-0006729 | | 1/2022 |
| KR | 20220015802 | A | 2/2022 |
| KR | 20220017330 | A | 2/2022 |
| KR | 20220048409 | A | 4/2022 |
| KR | 10-2022-0088213 | | 6/2022 |
| KR | 20220104548 | A | 7/2022 |
| KR | 20220113180 | A | 8/2022 |
| KR | 20220146141 | A | 11/2022 |

OTHER PUBLICATIONS

Search Report and Written Opinion dated Jan. 11, 2024 issued in International Patent Application No. PCT/KR2023/014711.
Search Report and Written Opinion dated Jan. 25, 2024 issued in International Patent Application No. PCT/KR2023/014940.
Extended European Search Report dated Jul. 3, 2025 for EP Application No. 23873167.3.

* cited by examiner

ELECTRONIC DEVICE CONTROLLING PULSE SIGNAL FROM PROCESSOR TO DISPLAY

CROSS-REFERENCE TO RELATED APPLICATIONS

This application is a continuation of PCT International Application No. PCT/KR2023/014940, which was filed on Sep. 26, 2023, and claims priority to Korean Patent Application No. 10-2022-0125365, filed on Sep. 30, 2022, in the Korean Intellectual Property Office and claims priority to Korean Patent Application No. 10-2023-0001471, filed on Jan. 4, 2023, in the Korean Intellectual Property Office and claims priority to Korean Patent Application No. 10-2023-0004350, filed on Jan. 11, 2023, in the Korean Intellectual Property Office and claims priority to Korean Patent Application No. 10-2023-0013290, filed on Jan. 31, 2023, in the Korean Intellectual Property Office and claims priority to Korean Patent Application No. 10-2023-0026723, filed on Feb. 28, 2023, in the Korean Intellectual Property Office and claims priority to PCT International Application No. PCT/KR2023/014711, filed on Sep. 25, 2023, in the Korean Intellectual Property Office, the disclosures of each of which are incorporated by reference herein their entireties.

BACKGROUND

Field

The disclosure relates to an electronic device controlling a pulse signal from a processor to a display.

Description of Related Art

An electronic device may include a display panel. For example, the electronic device may include a display driver circuit operably coupled with the display panel. For example, the display driver circuit may display an image obtained from a processor of the electronic device on the display panel.

The above-described information may be provided as a related art for the purpose of helping to understand the present disclosure. No claim or determination is raised as to whether any of the above-described information can be applied as a prior art related to the present disclosure.

SUMMARY

An electronic device is provided. The electronic device may comprise a processor. The electronic device may comprise a display including a display driver circuit and a display panel. The electronic device may comprise a first path connecting the display driver circuit to the processor. The electronic device may comprise a second path connecting the display driver circuit to the processor and separate from the first path. The processor may be configured to transmit, based on a first cycle, via the second path to the display driver circuit, a pulse signal to synchronize, with a first time period in the processor used to display an image transmitted via the first path to the display driver circuit on the display panel, the first time period in the display driver circuit being used to display the image on the display panel. The processor may be configured to change, based on a second cycle different from the first cycle, a waveform of the pulse signal transmitted from the first cycle from a first waveform to a second waveform to synchronize, with a second time period in the processor used for the display of the image, the second time period in the display driver circuit being used for the display of the image.

An electronic device is provided. The electronic device may comprise a processor. The electronic device may comprise a display including a display driver circuit and a display panel. The electronic device may comprise a first path connecting the display driver circuit to the processor. The electronic device may comprise a second path connecting the display driver circuit to the processor and separate from the first path. The processor may be configured to periodically transmit, via the second path to the display driver circuit, a pulse signal to synchronize, with a time period in the processor used to display on the display panel an image transmitted via the first path to the display driver circuit, the time period in the display driver circuit being used to display on the display panel the image. The processor may be configured to identify a control command to be provided to the display driver circuit with respect to the display of the image on the display panel. The processor may be configured to, based on the identification, change a waveform of the pulse signal that is periodically transmitted to the display driver circuit from a first waveform to a second waveform to indicate the control command to the display driver circuit.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
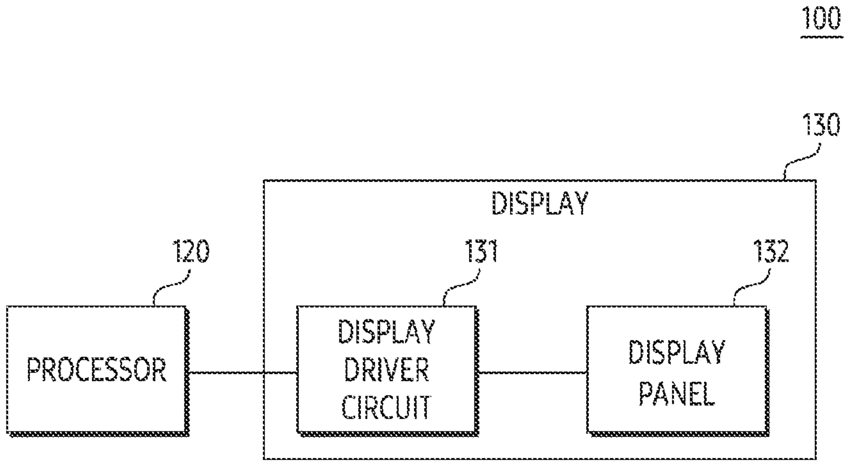
FIG. 1 is a simplified block diagram of an exemplary electronic device.

FIG. 1 is a simplified block diagram of an exemplary electronic device.

Referring to FIG. 1, an electronic device 100 may include a processor (e.g., including processing circuitry) 120 and a display 130. The display 130 may include a display driver circuit 131 and a display panel 132.

Figure 7:
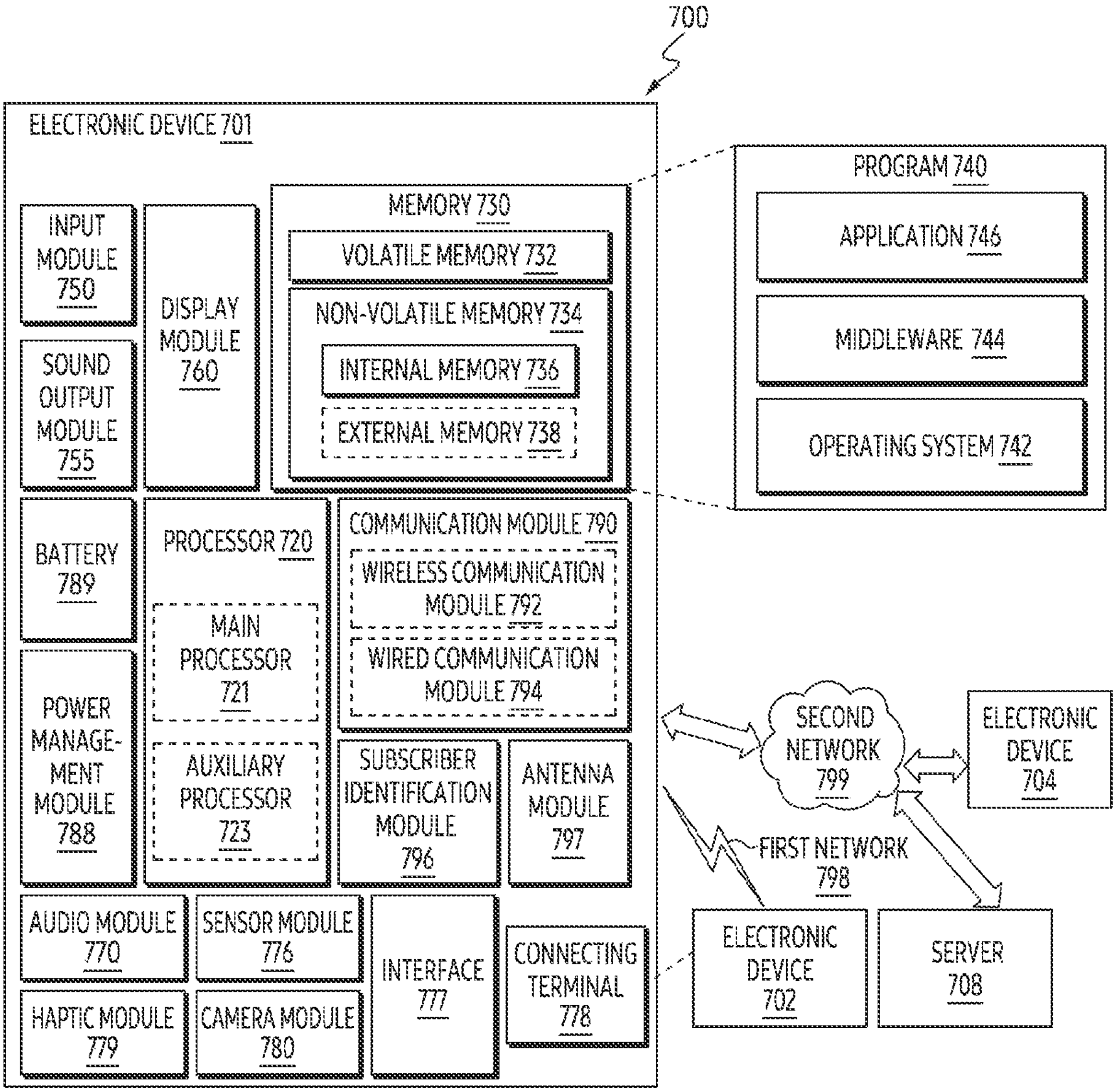
FIG. 7 is a block diagram of an electronic device in a network environment, according to various embodiments.

The processor 120 may include at least a portion of a processor 720 of FIG. 7. The display 130 may include at least a portion of a display module 760. The display driver circuit 131 may include at least a portion of a DDI 830 of FIG. 8. The display panel 132 may include at least a portion of a display 810 of FIG. 8.

The processor 120 may be operably coupled with the display 130 (or the display driver circuit 131). The operative coupling of the processor 120 and the display 130 (or the display driver circuit 131) may indicate that the processor 120 is directly connected with the display 130 (or the display driver circuit 131). The operative coupling of the processor 120 and the display 130 (or the display driver circuit 131) may indicate that the processor 120 is connected with the display 130 (or the display driver circuit 131) through another component of the electronic device 100.

The operative coupling of the processor 120 and the display 130 (or the display driver circuit 131) may indicate that the processor 120 at least partially controls the display 130 (or the display driver circuit 131) for a display of an image. The operative coupling of the processor 120 and the display 130 (or the display driver circuit 131) may indicate that the processor 120 transmit an image acquired or rendered by the processor 120 to the display driver circuit 130 (or the display driver circuit 131) in order for a display on the display panel 132. However, it is not limited thereto.

For example, the processor 120 is operably coupled with the display 130, but a portion of operations of the processor 120 may not be synchronized with a portion of operations of display 130.

As a non-limiting example, the portion of the operations of the display 130 are unnoticeable or transparent to the processor 120, the portion of the operations of the display 130 may not be synchronized with the portion of the operations of the processor 120. As a non-limiting example, since the portion of the operations of the display 130 are independent of the processor 120, the portion of the operations of the display 130 may not be synchronized with the portion of the operations of the processor 120. As a non-limiting example, since the portion of the operations of the display 130 are performed or executed while the processor 120 is in a disabled state (e.g., a low-power state, a sleep state, and/or a turn-off state), the portion of the operations of the display 130 may not be synchronized with the portion of the operations of the processor 120. As a non-limiting example, since the portion of the operations of the display 130 are performed or executed while an image transmission from the processor 120 to display 130 is ceased, the portion of the operations of the display 130 may not be synchronized with the portion of the operations of the processor 120. As a non-limiting example, since the portion of the operations of the display 130 are performed or executed while a path used for the transmission is disabled, the portion of the operations of the display 130 may not be synchronized with the portion of the operations of the processor 120. As a non-limiting example, the portion of the operations may include displaying an image stored in a graphic random access memory (GRAM) (e.g., a GRAM 220 of FIG. 2 or a memory 833 of FIG. 8) in the display driver circuit 131 on the display panel 132, while the transmission is ceased or the path is disabled.

As a non-limiting example, that the portion of the operations of the processor 120 are not synchronized with the portion of the operations of the display 130 may be caused by a reference time of the display 130 (or the display driver circuit 131) that is not synchronized with a reference time of the processor 120. As a non-limiting example, that the portion of the operations of the processor 120 are not synchronized with the portion of the operations of the display 130 may be caused by an operation of a clock for the display 130 (or the display driver circuit 131) that is not synchronized with an operation of a clock for the processor 120. As a non-limiting example, that the portion of the operations of the processor 120 are not synchronized with the portion of the operations of the display 130 may be caused by counting of the display driver circuit 131 that is not synchronized with counting of the processor 120 related to a display on the display panel 132.

For example, the processor 120 may periodically transmit a pulse signal to the display driver circuit 131, to synchronize the portion of the operations of the display 130 with the portion of the operations of the processor 120. As a non-limiting example, since the pulse signal is transmitted from outside (e.g., the processor 120) of the display 130 for a synchronization of the display 130, the pulse signal may be referred to as an external synchronization signal (Esync).

For example, a transmission path of the pulse signal may be different from a transmission path of an image to be displayed on the display panel 132. For example, the pulse signal may be transmitted from the processor 120 to the display driver circuit 131, via a second path different from a first path used to transmit the image to be displayed on the display panel 132 from the processor 120 to the display driver circuit 131. The first path and the second path may be illustrated in greater detail below with reference to FIG. 2.

Figure 2:
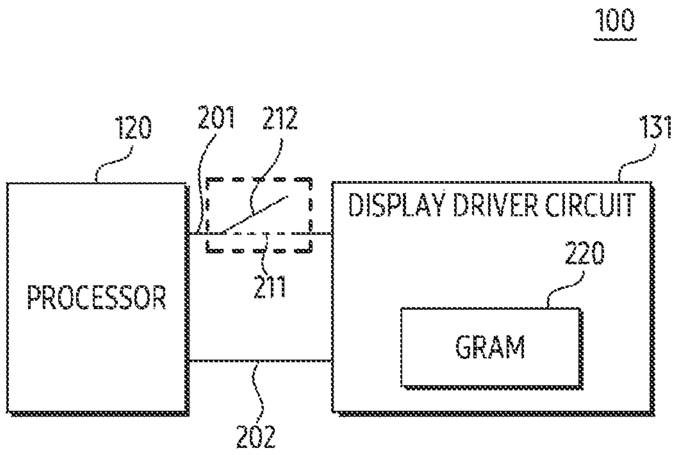
FIG. 2 illustrates an example of a first path and a second path each connecting a processor and a display driving circuit.

FIG. 2 illustrates an example of a first path and a second path each connecting a processor and a display driving circuit.

Referring to FIG. 2, the electronic device 100 may include a first path 201 connecting the display driver circuit 131 with the processor 120 and a second path 202 connecting the display driver circuit 131 with the processor 120 and separated from the first path 201.

The first path 201 may be used to transmit an image to be displayed on the display panel 132 (not shown in FIG. 2). For example, the processor 120 may transmit the image to be displayed on the display panel 132 to the display driver circuit 131 through the first path 201. For example, the first path 201 may include a mobile industry process interface (MIPI). For example, the first path 201 may be enabled within a time period (or a time interval) in which the image to be displayed on the display panel 132 is transmitted from the processor 120 to the display driver circuit 131, as indicated by a state 211. For example, the first path 201 may be disabled within at least a portion of a time period (or a time interval) in which the transmission is ceased, as indicated by a state 212. For example, the first path 201 may be disabled within at least a portion of a time period (or a time interval) in which the display driver circuit 131 executes a display on the display panel 132 based on a scan of an image stored in the GRAM 220 in the display driver circuit 131, as indicated by a state 212.

As a non-limiting example, enablement of the first path 201 may indicate that normal power is provided to the first path 201, and disablement of the first path 201 may indicate that low power is provided to the first path 201 or that providing power to the first path 201 is ceased. As a non-limiting example, the enablement of the first path 201 and the disablement of the first path 201 may be executed based on a control of the processor 120.

The second path 202 may be used for a transmission of the pulse signal. For example, transmitting the pulse signal through the second path 202 may be maintained even when transmitting an image through the first path 201 is ceased. For example, transmitting the pulse signal through the second path 202 may be maintained even when the first path 201 is disabled. For example, transmitting the pulse signal through the second path 202 may be maintained while an image stored in the GRAM 220 is scanned by the display driver circuit 131.

According to various embodiments, the pulse signal may be transmitted from the processor 120 to the display driver circuit 131 through the first path 201 while the first path 201 is enabled, and may be transmitted from the processor 110 to the display driver circuit 131 through the second path 202 while the first path 201 is disabled. For example, the processor 120 may adaptively identify a transmission path of the pulse signal from among the first path 201 and the second path 202, according to a state of the first path 201.

According to an embodiment, the second path 202 may be a dedicated path for (only) the pulse signal. According to an embodiment, the second path 202 may be used for a signal transmitted from the display driver circuit 131 to the processor 120 as well as the pulse signal. For example, the signal may be a signal indicating a state of the display driver circuit 131, which is transmitted from the display driver circuit 131 to the processor 120. For example, the signal may be a tearing effect (TE) signal. However, it is not limited thereto.

Referring back to FIG. 1, a transmission cycle (or transmission interval) of the pulse signal may correspond to a cycle (or interval) of a synchronization signal for the processor 120 used or identified for a display on the display panel 132. As a non-limiting example, the transmission cycle may correspond to a cycle of a horizontal synchronization signal for the processor 120 used for the display on the display panel 132. As a non-limiting example, the transmission cycle may correspond to a cycle of an emission synchronization signal for the processor 120 indicating a timing of an emission signal from the display driver circuit 131 to the display panel 132.

A waveform of the pulse signal may be changed to indicate a cycle of another synchronization signal for the processor 120, wherein the other synchronization signal is distinct from the synchronization signal indicated by the transmission cycle and is used or identified for a display on the display panel 132. As a non-limiting example, when the synchronization signal for the processor 120 indicated by the transmission cycle is the horizontal synchronization signal for the processor 120, the waveform may be changed based on a vertical synchronization signal for the processor 120 and/or the cycle of the emission synchronization signal for the processor 120. For example, the waveform of the pulse signal transmitted at a start timing of the horizontal synchronization signal for the processor 120 corresponding (or overlapping) to a start timing of the vertical synchronization signal (and/or the emission synchronization signal) for the processor 120 may be a second waveform (and/or a third waveform) different from the first waveform, which is the waveform of the pulse signal transmitted at the start timing of the horizontal synchronization signal for the processor 120 different from (or not overlapping) the start timing of the vertical synchronization signal for the processor 120 and/or the emission synchronization signal for the processor 120. As a non-limiting example, when the synchronization signal for the processor 120 indicated by the transmission cycle is the emission synchronization signal for the processor 120, the waveform may be changed based on the cycle of the vertical synchronization signal for the processor 120. For example, the waveform of the pulse signal transmitted at the start timing of the emission synchronization signal for the processor 120 corresponding (or overlapping) to the start timing of the vertical synchronization signal for the processor 120 may be the second waveform different from the first waveform, which is the waveform of the pulse signal transmitted at the start timing of the emission synchronization signal for the processor 120 different from (or not overlapping) the start timing of the vertical synchronization signal for the processor 120.

The transmission cycle of the pulse signal and the waveform of the pulse signal may be illustrated in greater detail below with reference to FIGS. 3, 4 and 5.

Figure 3:
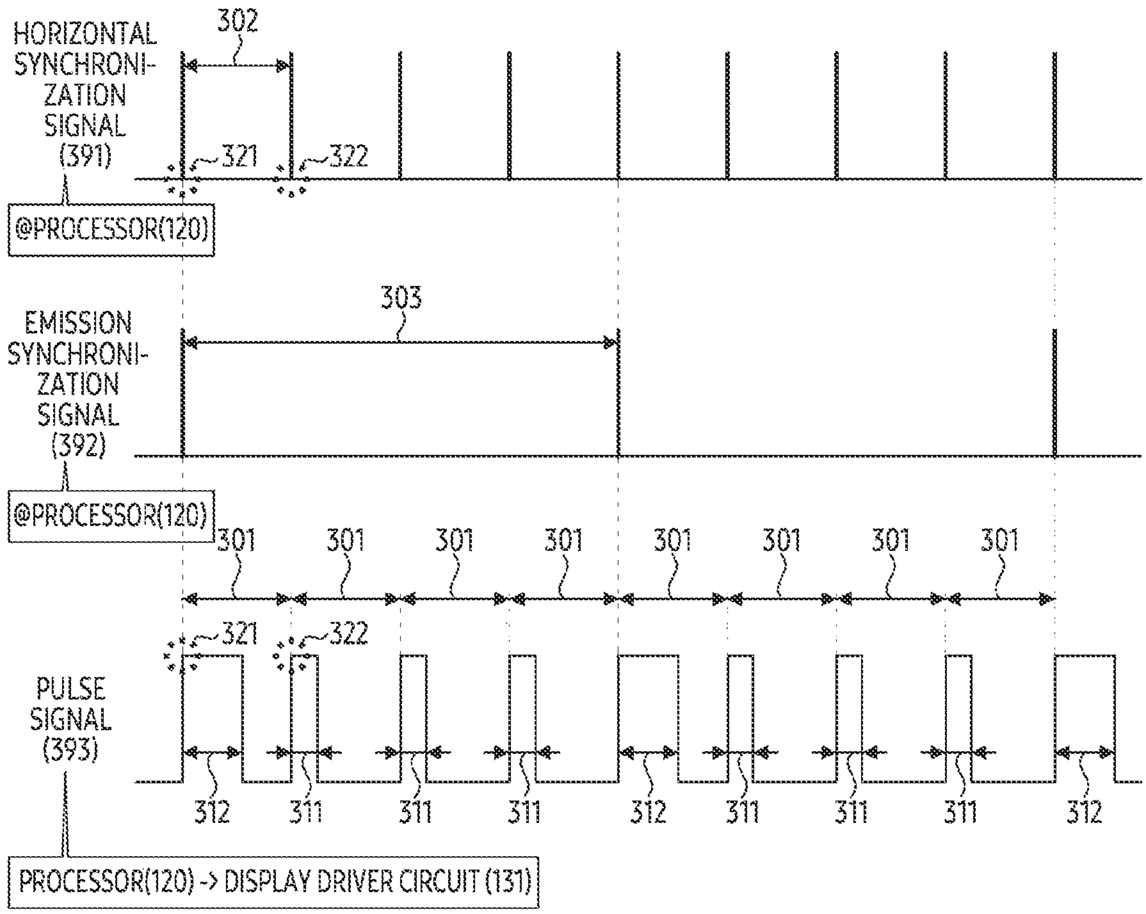
FIG. 3 illustrates an example of a pulse signal indicating a timing of a horizontal synchronization signal and a timing of an emission synchronization signal.

FIG. 3 illustrates an example of a pulse signal indicating a timing of a horizontal synchronization signal and a timing of an emission synchronization signal.

Referring to FIG. 3, a transmission cycle 301 of a pulse signal 393 may correspond to a cycle 302 of a horizontal synchronization signal 391 for the processor 120. For example, the transmission cycle 301 of the pulse signal 393 may indicate the cycle 302 of the horizontal synchronization signal 391. For example, the pulse signal 393 may have the transmission cycle 301, to synchronize, with a first time period in the processor 120 corresponding to the cycle 302 of the horizontal synchronization signal 391, the first time period in the display driver circuit 131 corresponding to a cycle of a horizontal synchronization signal for the display driver circuit 131.

For example, the waveform of the pulse signal 393 may be changed, based at least in portion on whether a start timing of the horizontal synchronization signal 391 overlaps (or corresponds) a start timing of an emission synchronization signal 392 for the processor 120. For example, a width of the pulse signal 393 transmitted at the start timing of the horizontal synchronization signal 391 overlapping the start timing of the emission synchronization signal 392 may be different from a width of the pulse signal 393 transmitted at the start timing of the horizontal synchronization signal 391 that does not overlap with the start timing of the emission synchronization signal 392.

For example, the waveform of the pulse signal 393 transmitted from the processor 120 to the display driver circuit 131 at the start timing 321 of the horizontal synchronization signal 391 overlapping with the start timing of the emission synchronization signal 392 may be the second waveform different first waveform, which is a waveform of the pulse signal 393 transmitted at the start timing 322 of the horizontal synchronization signal 391 that does not overlap with the start timing of the emission synchronization signal 392. For example, a width 312 of the pulse signal 393 transmitted at the start timing 321 of the horizontal synchronization signal 391 may be different from a width 311 of the pulse signal 393 transmitted at the start timing 322 of the horizontal synchronization signal 391. For example, the processor 120 may change the waveform of the pulse signal 393, by changing the width of the pulse signal 393 to be transmitted at the start timing 321 of the horizontal synchronization signal 391 from the width 311 to the width 312. For example, the processor 120 may change the waveform of the pulse signal 393, by changing the width of the pulse signal 393 to be transmitted at the start timing 322 of the horizontal synchronization signal 391 from the width 312 to the width 311.

For example, since the start timing of the emission synchronization signal 392 identified according to counting of the horizontal synchronization signal 391 in the processor 120 and the start timing of the emission synchronization signal for the display driver circuit 131 identified according to counting of the horizontal synchronization signal for the display driver circuit 131 in the display driver circuit 131 may be changed according to a state of the processor 120 and/or a state of the display driver circuit 131, the processor 120 may provide information on the emission synchronization signal 392 to the display driver circuit 131 through the change of the waveform.

As a non-limiting example, when the processor 120 and the display 130 execute an image update according to the timing (or a transmission timing) of the emission signal, the pulse signal 393 may indicate the cycle 302 of the horizontal synchronization signal 391 through the transmission cycle 301, and the cycle 303 of the emission synchronization signal 392 through a width (e.g., the width 311 or the width 312). However, it is not limited thereto.

Figure 4:
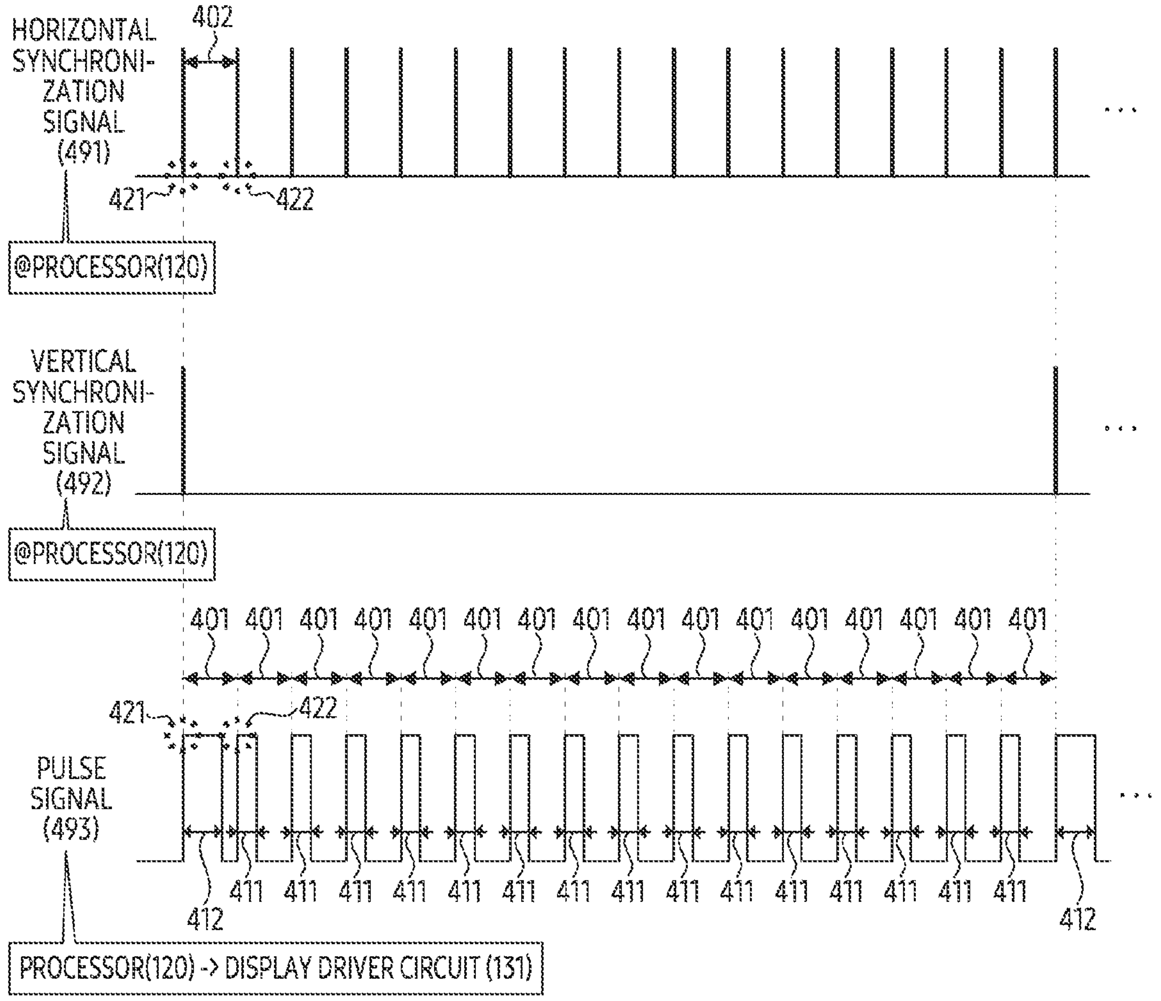
FIG. 4 illustrates an example of a pulse signal indicating a timing of a horizontal synchronization signal and a timing of a vertical synchronization signal.

FIG. 4 illustrates an example of a pulse signal indicating a timing of a horizontal synchronization signal and a timing of a vertical synchronization signal.

Referring to FIG. 4, a transmission cycle 401 of a pulse signal 493 may correspond to a cycle 402 of a horizontal synchronization signal 491 for the processor 120. For example, the transmission cycle 401 of the pulse signal 493 may indicate the cycle 402 of the horizontal synchronization signal 491. For example, the pulse signal 493 may have the transmission cycle 401, to synchronize, with a first time period in the processor 120 corresponding to the cycle 402 of the horizontal synchronization signal 491, the first time period in the display driver circuit 131 corresponding to a cycle of a horizontal synchronization signal for the display driver circuit 131.

For example, the waveform of the pulse signal 493 may be changed, based at least in portion on whether a start timing of the horizontal synchronization signal 491 overlaps (or corresponds) a start timing of a vertical synchronization signal 492 for the processor 120. For example, a width of the pulse signal 493 transmitted at the start timing of the horizontal synchronization signal 491 overlapping the start timing of the vertical synchronization signal 492 may be different from a width of the pulse signal 493 transmitted at the start timing of the horizontal synchronization signal 491 that does not overlap with the start timing of the vertical synchronization signal 492.

For example, the waveform of the pulse signal 493 transmitted from the processor 120 to the display driver circuit 131 at the start timing 421 of the horizontal synchronization signal 491 overlapping with the start timing of the vertical synchronization signal 492 may be the second waveform different first waveform, which is a waveform of the pulse signal 493 transmitted at the start timing 422 of the horizontal synchronization signal 491 that does not overlap with the start timing of the vertical synchronization signal 492. For example, a width 412 of the pulse signal 493 transmitted at the start timing 421 of the horizontal synchronization signal 491 may be different from a width 411 of the pulse signal 493 transmitted at the start timing 422 of the horizontal synchronization signal 491. For example, the processor 120 may change the waveform of the pulse signal 493, by changing the width of the pulse signal 493 to be transmitted at the start timing 421 of the horizontal synchronization signal 491 from the width 411 to the width 412. For example, the processor 120 may change the waveform of the pulse signal 493, by changing the width of the pulse signal 493 to be transmitted at the start timing 422 of the horizontal synchronization signal 491 from the width 412 to the width 411.

For example, since the start timing of the vertical synchronization signal 492 identified according to counting of the horizontal synchronization signal 491 in the processor 120 and the start timing of the vertical synchronization signal for the display driver circuit 131 identified according to counting of the horizontal synchronization signal for the display driver circuit 131 in the display driver circuit 131 may be changed according to a state of the processor 120 and/or a state of the display driver circuit 131, the processor 120 may provide information on the vertical synchronization signal 492 to the display driver circuit 131 through the change of the waveform.

Figure 5:
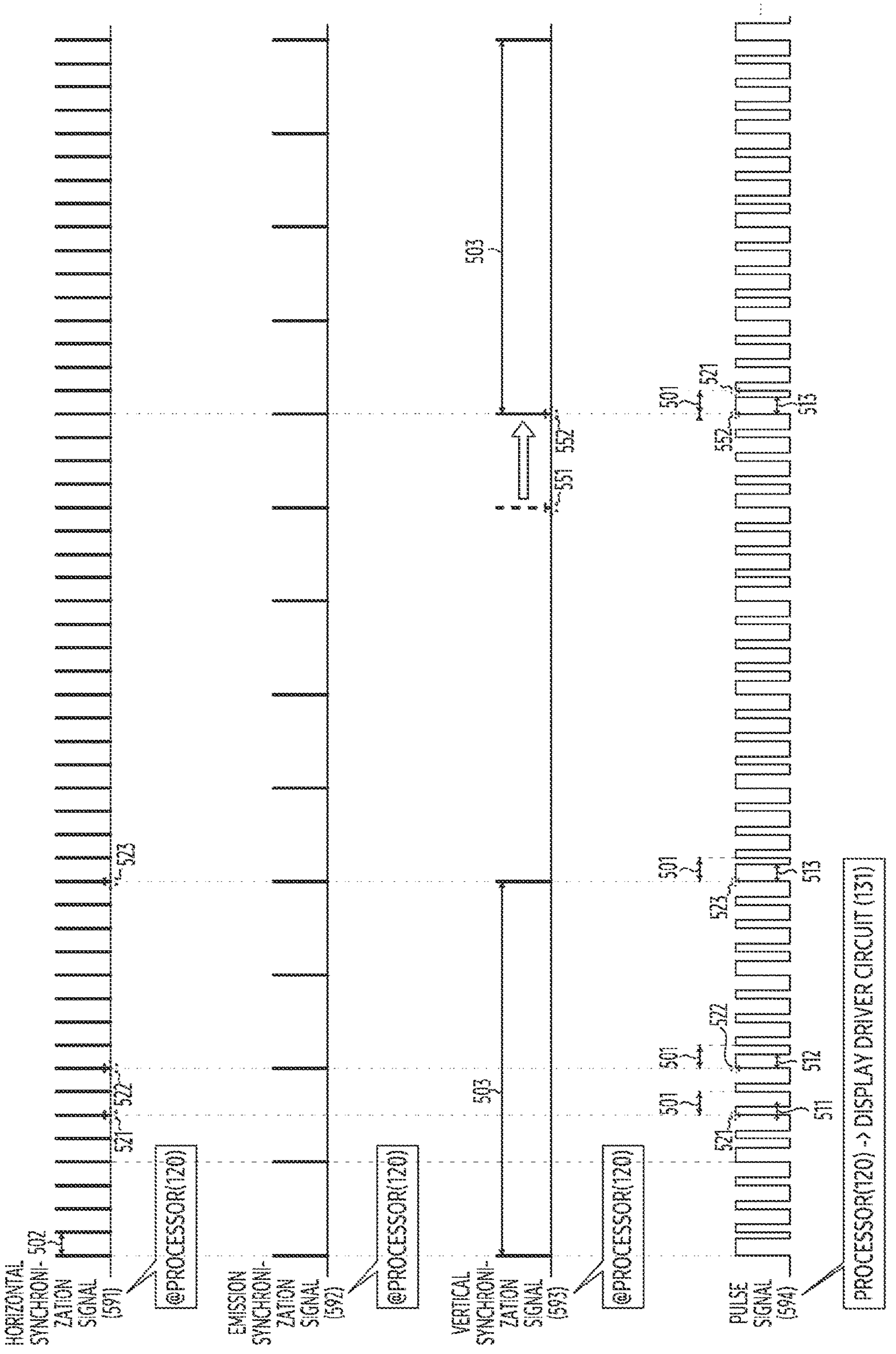
FIG. 5 illustrates an exemplary method of changing a waveform of a pulse signal according to a change in a timing of a vertical synchronization signal.

FIG. 5 illustrates an exemplary method of changing a waveform of a pulse signal according to a change in a timing of a vertical synchronization signal.

Referring to FIG. 5, the processor 120 may transmit a pulse signal 594 to the display driver circuit 131 based on a transmission cycle 501, to indicate a cycle 502 (or a timing (or start timing) of a horizontal synchronization signal 591) of a horizontal synchronization signal 591 for the processor 120. For example, the processor 120 may change a width of the pulse signal 594 to indicate a start timing (or a timing) of an emission synchronization signal 592 for the processor 120. For example, the processor 120 may change a width of the pulse signal 594 to indicate a start timing of a vertical synchronization signal 593 for the processor 120. For example, the processor 120 may transmit a pulse signal 594 with a width 511 different from a width 512 and a width 513 to the display driver circuit 131 at a start timing 521 of the horizontal synchronization signal 591 that does not overlap with the start timing of the emission synchronization signal 592 and the start timing of the vertical synchronization signal 593, transmit the pulse signal 594 with the width 512 different from the width 511 and the width 513 to the display driver circuit 131 at the start timing 522 of the horizontal synchronization signal 591 that overlaps with the start timing of the emission synchronization signal 592 and does not overlap with the start timing of the vertical synchronization signal 593, and transmit the pulse signal 594 with the width 513 different from the width 511 and the width 512 at the start timing 523 of the horizontal synchronization signal 591 that overlaps with the start timing of the emission synchronization signal 592 and the start timing of the vertical synchronization signal 593.

For example, the processor 120 may change a timing for changing a waveform of the pulse signal in response to a change in a timing of a synchronization signal. For example, a timing (or a start timing) of the vertical synchronization signal 593 may be changed. For example, when obtaining an image to be displayed on the display panel 132 and/or rendering the image to be displayed on the display panel 132 is delayed, the timing of the vertical synchronization signal 593 may be changed. As a non-limiting example, the delay may be caused by a timing at which user input is received. As a non-limiting example, the delay may be caused by a load of the processor 120. As a non-limiting example, the delay may be caused by the number of layers configuring an image to be displayed on the display panel 132. For another example, the timing of the vertical synchronization signal 593 may be changed according to a change in a refresh rate. However, it is not limited thereto.

For example, the processor 120 may change the start timing of the vertical synchronization signal 593 from a targeted timing 551 to a timing 552. Each of the targeted timing 551 and the timing 552 may overlap the start timing of the emission synchronization signal 592 for the processor 120. For example, the timing 552 may be identified from among the start timing of the emission synchronization signal 592 after the targeted timing 551.

For example, the processor 120 may change a waveform of the pulse signal 594 based on identifying the start timing of the vertical synchronization signal 593 as the timing 552 changed from the targeted timing 551. For example, the processor 120 may change a timing of transmitting the pulse signal 594 with the width 513, based on changing the start timing of the vertical synchronization signal 593 to the timing 552 changed from the targeted timing 551. For example, the processor 120 may refrain from or bypass transmitting the pulse signal 594 with the width 513 to the display driver circuit 131 at the targeted timing 551, and transmit the pulse signal 594 having the width 513 to the display driver circuit 131 at the timing 552, based on identifying the start timing of the vertical synchronization signal 593 as the timing 552 changed from the targeted timing 551. For example, the processor 120 may request or inform the display driver circuit 131 to change the timing of the vertical synchronization signal for the display driver circuit 131, by transmitting the pulse signal 594 with the width 513 to the display driver circuit 131 at the timing 552.

As a non-limiting example, after the start timing of the vertical synchronization signal 593 is changed to the timing 552, the cycle 503 of the vertical synchronization signal 593 may be restored. For example, when the cycle 503 is restored, the processor 120 may transmit the pulse signal 594 with the width 513 for each the cycle 503.

Referring back to FIG. 1, the pulse signal may be transmitted from the processor 120 to the display driver circuit 131, to provide the display driver circuit 131 with a control command (or a command) related to a display on the display panel 132. For example, the control command may be indicated by changing the waveform (or width) of the pulse signal. For example, the processor 120 may identify the control command to be provided to the display driver circuit 131 with respect to the display of the image on the display panel 132. For example, the processor 120 may identify the control command to be synchronized with an image on the display panel 132. For example, the processor 120 may change the waveform of the pulse signal periodically transmitted to the display driver circuit 131, in order to indicate the control command to the display driver circuit 131 based on the identification. For example, the control command may include a control command (e.g., still indication, sticky flag indication, and/or on-the-fly indication) indicating that the image is stored in GRAM (e.g., the GRAM 220 of FIG. 2) in the display driver circuit 131.

For example, the control command may include a control command indicating that a refresh rate (or a refresh rate of the image provided from the processor 120 to display driver circuit 131) of the display panel 132 is changed. For example, the control command may include a control command indicating a change in an interface with respect to the image. However, it is not limited thereto.

The waveform of the pulse signal changed to indicate the control command may be illustrated by way of non-limiting example below with reference to FIG. 6.

Figure 6:
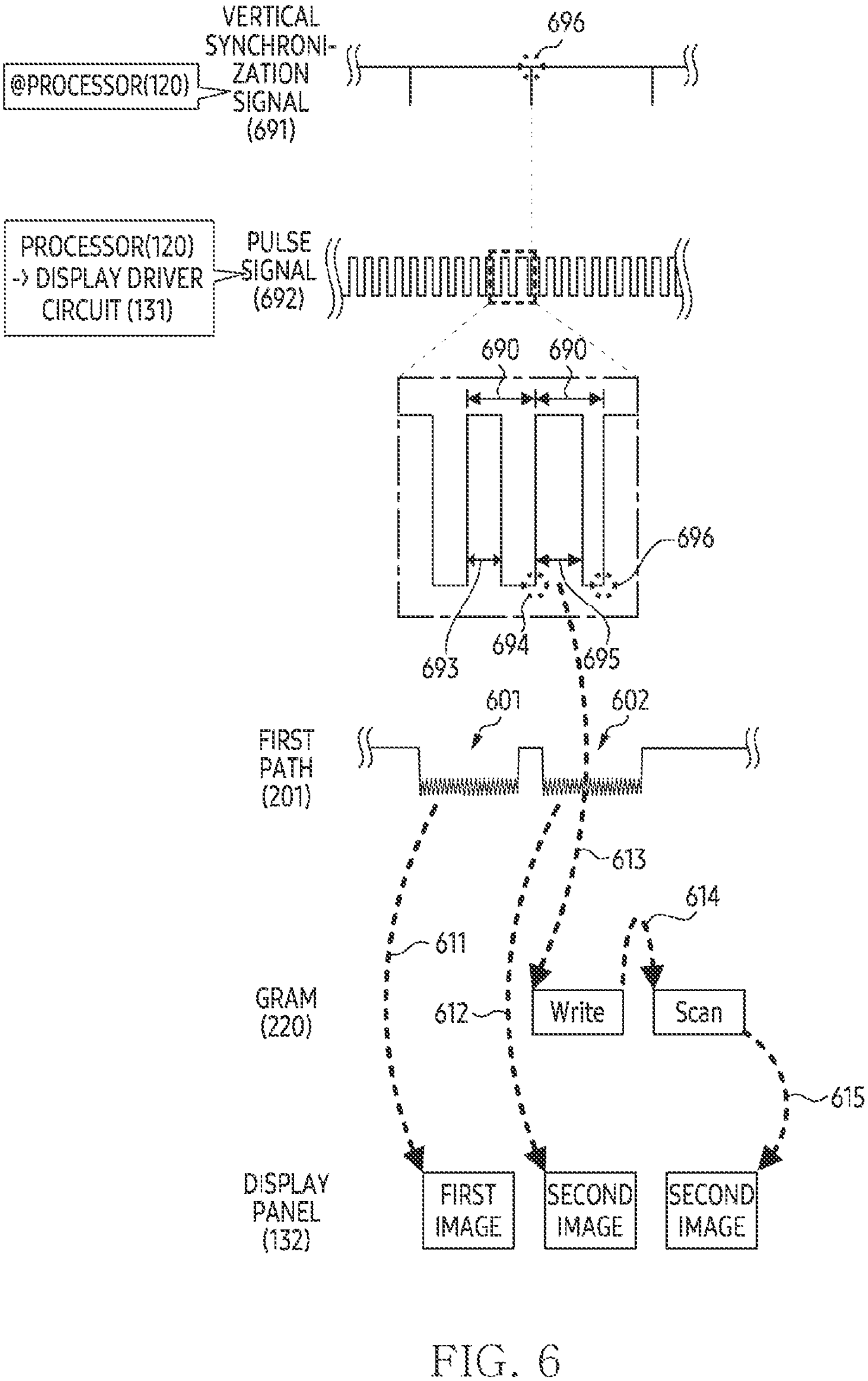
FIG. 6 illustrates an exemplary method of changing a waveform of a pulse signal to indicate a control command.

FIG. 6 illustrates an exemplary method of changing a waveform of a pulse signal to indicate a control command.

Referring to FIG. 6, the processor 120 may transmit a first image to the display driver circuit 131 through a first path 201, as shown in a state 601. The display driver circuit 131 may display the first image received from the processor 120 through the first path 201 on the display panel 132, as indicated by an arrow 611.

The processor 120 may transmit a second image to the display driver circuit 131 through a first path 201, as shown in a state 602. The display driver circuit 131 may display the second image received from the processor 120 through the first path 201 on the display panel 132, as indicated by an arrow 612. As a non-limiting example, the second image may be at least partially different from the first image. As a non-limiting example, the second image may be the same as the first image. For example, the second image may be the first image transmitted again from the processor 120.

The processor 120 may identify to provide a control command indicating that the second image is stored in the GRAM 220 to the display driver circuit 131, based on the second image.

For example, the control command may be identified based on identifying that a time when the first image is displayed on the display panel 132 is longer than or equal to a reference time. However, it is not limited thereto. For example, the processor 120 may provide the control command to the display driver circuit 131 by changing a width of the pulse signal 692 transmitted to the display driver circuit 131 based on a cycle 690 through the second path 202. For example, the processor 120 may provide the control command to display driver circuit 131, by changing a width of the pulse signal 692 transmitted at a timing 694 before the second image is provided to the display driver circuit 131 from a width 693 to a width 695. For example, the timing 694 may be before a start timing 696 of the vertical synchronization signal 691 for the second image. For example, the display driver circuit 131 may receive the pulse signal 692 with the width 695 from the processor 120. For example, the display driver circuit 131 may store the second image in the GRAM 220, in response to the pulse signal 692 with the width 695 different from the width 693, as indicated by an arrow 613. For example, the display driver circuit 131 may scan the second image stored in the GRAM 220, based on a change from the first image to the second image (and/or the pulse signal 692 with the width 695), as indicated by an arrow 614. For example, the display driver circuit 131 may display the second image again on the display panel 132, based on scanning the second image, as indicated by an arrow 615. For example, displaying the second image on the display panel 132 again may be executed in order to reduce an afterimage that may be caused on the display panel 132 according to the change from the first image to the second image. However, it is not limited thereto.

Although not illustrated in FIG. 6, the pulse signal 692 may further indicate the start timing (or a timing) of the vertical synchronization signal 691. For example, the processor 120 may transmit the pulse signal 692 with a width different from the width 693 and the width 695, to the display driver circuit 131 through the second path 202, at the start timing of the horizontal synchronization signal for the processor 120 overlapping (or corresponding) to the start timing 696 of the vertical synchronization signal 691.

Although not illustrated in FIG. 6, the pulse signal 692 may further indicate the start timing of the emission synchronization signal for the processor 120. For example, the processor 120 may transmit the pulse signal 692 with a width to the display driver circuit 131 through the second path 202 at the start timing of the horizontal synchronization signal overlapping the start timing of the emission synchronization signal, wherein the width being different from the width 693, the width 695, and a width to indicate the start timing 696 of the vertical synchronization signal 691.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or at least one of an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In various embodiments, at least one of the components (e.g., the connecting terminal 778) may be omitted from the electronic device 701, or one or more other components may be added in the electronic device 701. In various embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation.

According to an embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state.

According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to an embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mmWave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., 20 Gbps or more) for implementing eMBB, loss coverage (e.g., 764 dB or less) for implementing mMTC, or U-plane latency (e.g., 0.5 ms or less for each of downlink (DL) and uplink (UL), or a round trip of 7 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element including a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In an embodiment, the external electronic device 704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

Figure 8:
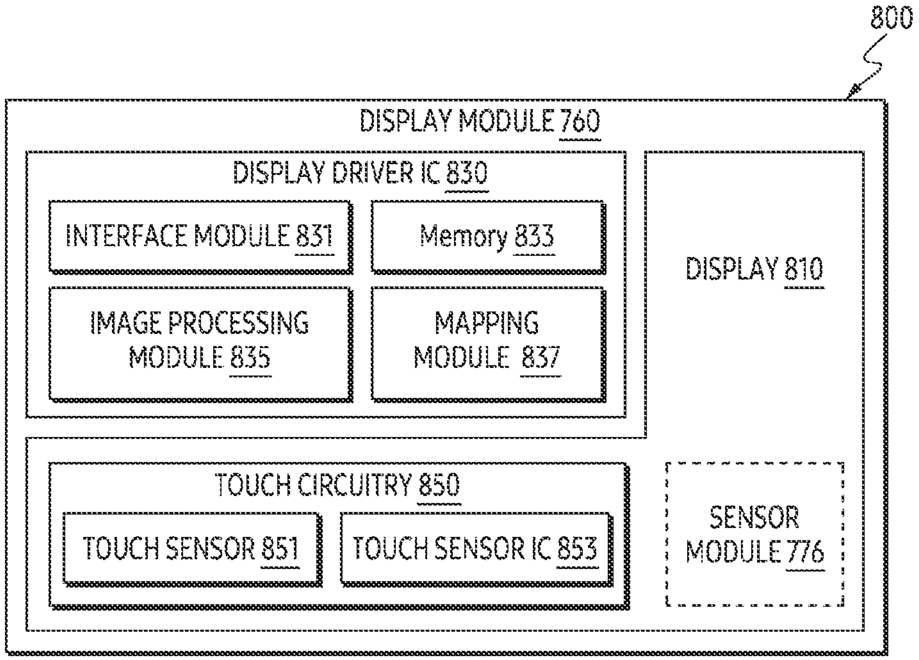
FIG. 8 is a block diagram of a display module, according to various embodiments.

FIG. 8 is a block diagram 800 illustrating the display module 760 according to various embodiments. Referring to FIG. 8, the display module 760 may include a display 810 and a display driver integrated circuit (DDI) 830 to control the display 810. The DDI 830 may include an interface module 831, memory 833 (e.g., buffer memory), an image processing module 835, or a mapping module 837. The various modules of the DDI may include various processing circuitry and/or executable program instructions. The DDI 830 may receive image information that contains image data or an image control signal corresponding to a command to control the image data from another component of the electronic device 701 via the interface module 831. For example, according to an embodiment, the image information may be received from the processor 720 (e.g., the main processor 721 (e.g., an application processor)) or the auxiliary processor 723 (e.g., a graphics processing unit) operated independently from the function of the main processor 721. The DDI 830 may communicate, for example, with touch circuitry 750 or the sensor module 776 via the interface module 831. The DDI 830 may also store at least part of the received image information in the memory 833, for example, on a frame by frame basis. The image processing module 835 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 810. The mapping module 837 may generate a voltage value or a current value corresponding to the image data pre-processed or post-processed by the image processing module 835. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 810 may be driven, for example, based at least in part on the voltage value or the current value such that visual information (e.g., a text, an image, or an icon) corresponding to the image data may be displayed via the display 810.

According to an embodiment, the display module 760 may further include the touch circuitry 850. The touch circuitry 850 may include a touch sensor 851 and a touch sensor IC 853 to control the touch sensor 851. The touch sensor IC 853 may control the touch sensor 851 to sense a touch input or a hovering input with respect to a certain position on the display 810. To achieve this, for example, the touch sensor 851 may detect (e.g., measure) a change in a signal (e.g., a voltage, a quantity of light, a resistance, or a quantity of one or more electric charges) corresponding to the certain position on the display 810. The touch circuitry 850 may provide input information (e.g., a position, an area, a pressure, or a time) indicative of the touch input or the hovering input detected via the touch sensor 851 to the processor 720. According to an embodiment, at least part (e.g., the touch sensor IC 853) of the touch circuitry 850 may be formed as part of the display 810 or the DDI 830, or as part of another component (e.g., the auxiliary processor 723) disposed outside the display module 760.

According to an embodiment, the display module 760 may further include at least one sensor (e.g., a fingerprint sensor, an iris sensor, a pressure sensor, or an illuminance sensor) of the sensor module 776 or a control circuit for the at least one sensor. In such a case, the at least one sensor or the control circuit for the at least one sensor may be embedded in one portion of a component (e.g., the display 810, the DDI 830, or the touch circuitry 750)) of the display module 760. For example, when the sensor module 776 embedded in the display module 760 includes a biometric sensor (e.g., a fingerprint sensor), the biometric sensor may obtain biometric information (e.g., a fingerprint image) corresponding to a touch input received via a portion of the display 810.

As another example, when the sensor module 776 embedded in the display module 760 includes a pressure sensor, the pressure sensor may obtain pressure information corresponding to a touch input received via a partial or whole area of the display 810. According to an embodiment, the touch sensor 851 or the sensor module 776 may be disposed between pixels in a pixel layer of the display 810, or over or under the pixel layer.

As described above, an electronic device may comprise: a processor, a display including a display driver circuit and a display panel, a first path connecting the display driver circuit to the processor, and a second path connecting the display driver circuit to the processor and separated from the first path. According to an example embodiment, the processor 120 may be configured to transmit, based on a first cycle, via the second path to the display driver circuit, a pulse signal to synchronize, with a first time period in the processor used to display an image transmitted via the first path to the display driver circuit on the display panel, the first time period in the display driver circuit used to display the image on the display panel. According to an example embodiment, the processor may be configured to change, based on a second cycle different from the first cycle, a waveform of the pulse signal transmitted from the first cycle from a first waveform to a second waveform to synchronize, with a second time period in the processor used for the display of the image, the second time period in the display driver circuit used for the display of the image.

According to an example embodiment, the first path may be disabled in at least portion of a time period that ceases to transmit an image from the processor to the display driver circuit. According to an example embodiment, the processor may be configured to maintain, while the first path is disabled, transmitting the pulse signal via the second path to the display driver circuit.

According to an example embodiment, the display driver circuit may include a graphic random access memory (GRAM). According to an example embodiment, the first path may be disabled in at least portion of a time period that executes a display on the display panel by scanning, by the display driver circuit, an image in the GRAM, wherein the image received from the processor. According to an example embodiment, the processor may be configured to maintain, while the first path is disabled, transmitting the pulse signal via the second path to the display driver circuit.

According to an example embodiment, the second time period may be longer than the first time period.

According to an example embodiment, the first time period may correspond to a cycle of a horizontal synchronization signal. According to an example embodiment, the second time period may correspond to a cycle of a vertical synchronization signal. According to an example embodiment, the processor may be configured to transmit, via the second path to the display driver circuit, the pulse signal with the second waveform, at first transmission timings each corresponding to a start timing of the vertical synchronization signal used in the processor from among transmission timings according to the first cycle. According to an example embodiment, the processor may be configured to transmit, via the second path to the display driver circuit, the pulse signal with the first waveform, at second transmission timings each different from the start timing from among the transmission timings.

According to an example embodiment, the first time period may correspond to a cycle of a horizontal synchronization signal. According to an example embodiment, the second time period may correspond to a cycle of emission synchronization signal indicating a transmission timing of an emission signal from the display driver circuit to the display panel. According to an example embodiment, the processor may be configured to transmit, via the second path to the display driver circuit, the pulse signal with the second waveform, at first transmission timings each corresponding to a start timing of the emission synchronization signal used in the processor from among transmission timings according to the first cycle. According to an example embodiment, the processor may be configured to transmit, via the second path to the display driver circuit, the pulse signal with the first waveform, at second transmission timings each different from the start timing from among the transmission timings.

According to an example embodiment, the processor may be configured to change the waveform from the first waveform to the second waveform by changing a width of the pulse signal.

According to an example embodiment, the processor may be configured to identify a control command to be provided to the display driver circuit with respect to the display of the image on the display panel. According to an example embodiment, the processor may be configured to change the waveform to a third waveform different from the first waveform and the second waveform to indicate the control command to the display driver circuit.

According to an example embodiment, the control command may comprise a control command indicating to store the image in the GRAM.

According to an example embodiment, the control command may comprise a control command indicating to change a refresh rate of the image provided from the processor to the display driver circuit.

As described above, according to an example embodiment, an electronic device 100 may comprise: a processor, a display including a display driver circuit and a display panel, a first path connecting the display driver circuit to the processor, a second path connecting the display driver circuit to the processor and separated from the first path. According to an example embodiment, the processor may be configured to periodically transmit, via the second path to the display driver circuit, a pulse signal to synchronize, with a time period in the processor used to display on the display panel an image transmitted via the first path to the display driver circuit, the time period in the display driver circuit used to display on the display panel the image. According to an example embodiment, the processor may be configured to identify a control command to be provided to the display driver circuit with respect to the display of the image on the display panel. According to an example embodiment, the processor may be configured to, based on the identification, change a waveform of the pulse signal that is periodically transmitted to the display driver circuit from a first waveform to a second waveform to indicate the control command to the display driver circuit.

According to an example embodiment, the display driver circuit may include a graphic random access memory (GRAM). According to an example embodiment, the control command may comprise a control command indicating to store the image in the GRAM.

According to an example embodiment, the control command may comprise a control command indicating to change a refresh rate of the image provided from the processor to the display driver circuit.

According to an example embodiment, the first path may be disabled in at least portion of a time period that ceases to transmit an image from the processor to the display driver circuit. According to an example embodiment, the processor may be configured to maintain to transmit the pulse signal via the second path to the display driver circuit, while the first path is disabled.

According to an example embodiment, the first path may be disabled in at least portion of a time period that executes a display on the display panel by scanning, by the display driver circuit, an image in the GRAM, wherein the image received from the processor. According to an example embodiment, the processor may be configured to maintain transmitting the pulse signal via the second path to the display driver circuit, while the first path is disabled.

According to an example embodiment, the processor may be configured to periodically transmit the pulse signal by transmitting the pulse signal based on the first cycle. According to an example embodiment, the processor may be configured to change, based on a second cycle different from the first cycle, a waveform of the pulse signal transmitted based on the first cycle from a first waveform or a second waveform to a third waveform to synchronize, with another time period in the processor used for the display of the image, the other time period in the display driver circuit used for the display of the image.

According to an example embodiment, the other time period may be longer than the time period.

According to an example embodiment, the time period may correspond to a cycle of a horizontal synchronization signal. According to an example embodiment, the other time period may correspond to a vertical synchronization signal. According to an example embodiment, the processor may be configured to transmit, via the second path to the display driver circuit, the pulse signal with the third waveform, at first transmission timings each corresponding to a start timing of the vertical synchronization signal used in the processor from among transmission timings according to the first cycle. According to an example embodiment, the processor may be configured to transmit, via the second path to the display driver circuit, the pulse signal with the first waveform, at second transmission timings each different from the start timing from among the transmission timings.

According to an example embodiment, the second transmission timings may be different from third transmission timings for indicating the control command from among the transmission timings.

According to an example embodiment, the processor 120 may be configured to change the waveform from the first waveform to the second waveform by changing a width of the pulse signal.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor comprising processing circuitry;

memory comprising one or more storage media storing instructions;

a display including display driver circuitry and a display panel;

a first path, connecting the display driver circuitry to the at least one processor, configured to transmit an image from the at least one processor to the display driver circuitry; and a second path, connecting the display driver circuitry to the at least one processor, separated from the first path, wherein the instructions, when executed by the at least one processor individually or collectively, cause the electronic device to:

periodically transmit, via the second path, from the at least one processor to the display driver circuitry, a pulse signal to synchronize counting of the at least one processor performed for displaying an image on the display panel with counting of the display driver circuitry performed for displaying an image on the display panel;

in response to a start timing of a first synchronization signal for the at least one processor being identified as not overlapping a start timing of a second synchronization signal for the at least one processor in accordance with the counting of the at least one processor, set a waveform of the pulse signal periodically transmitted as a first waveform; and in response to a start timing of the first synchronization signal for the at least one processor being identified as overlapping a start timing of the second synchronization signal for the at least one processor in accordance with the counting of the at least one processor, set the waveform of the pulse signal periodically transmitted as a second waveform different from the first waveform, and wherein a cycle of the first synchronization signal for the at least one processor is shorter than a cycle of the second synchronization signal for the at least one processor.

2. The electronic device of claim 1, wherein the first path is configured to be disabled in at least portion of a time period that ceases to transmit an image from the at least one processor to the display driver circuitry, and wherein the instructions, when executed by the at least one processor individually or collectively, cause the electronic device to maintain, while the first path is disabled, the pulse signal periodically transmitted via the second path from the at least one processor to the display driver circuitry.

3. The electronic device of claim 1, wherein the display driver circuitry includes a graphic random access memory (GRAM), wherein the first path is configured to be disabled in at least portion of a time period that executes displaying on the display panel by scanning, by the display driver circuitry, an image stored in the GRAM, and wherein the instructions, when executed by the at least one processor individually or collectively, cause the electronic device to maintain, while the first path is disabled, the pulse signal periodically transmitted via the second path from the at least one processor to the display driver circuitry.

4. The electronic device of claim 1, wherein the display driver circuitry is configured to:

based on the waveform of the pulse signal periodically transmitted from the at least one processor to the display driver circuitry being identified as the first waveform, synchronize the first synchronization signal for the display driver circuitry with the first synchronization signal for the at least one processor; and based on the waveform of the pulse signal periodically transmitted from the at least one processor to the display driver circuitry being identified as the second waveform, synchronize the second synchronization signal for the display driver circuitry with the second synchronization signal for the at least one processor.

5. The electronic device of claim 1, wherein the first synchronization signal for the at least one processor comprises a horizontal synchronization signal for the at least one processor, and wherein the second synchronization signal for the at least one processor comprises a vertical synchronization signal for the at least one processor.

6. The electronic device of claim 1, wherein the first synchronization signal for the at least one processor comprises a horizontal synchronization signal for the at least one processor, and wherein the second synchronization signal for the at least one processor comprises an emission synchronization signal for the at least one processor indicating a transmission timing of an emission signal from the display driver circuitry to the display panel.

7. The electronic device of claim 1, wherein the instructions, when executed by the at least one processor individually or collectively, cause the electronic device to:

set the waveform of the pulse signal periodically transmitted as the first waveform by setting a width of the pulse signal as a first width; and set the waveform of the pulse signal periodically transmitted as the second waveform by setting the width of the pulse signal as a second width different from the first width.

8. The electronic device of claim 1, wherein a transmission cycle of the pulse signal periodically transmitted corresponds to the cycle of the first synchronization signal for the at least one processor.

9. The electronic device of claim 1, wherein the instructions, when executed by the at least one processor individually or collectively, cause the electronic device to:

identify a control command to be provided to the display driver circuitry with respect to displaying an image on the display panel; and based on the identification, provide the control command to the display driver circuitry by setting the waveform of the pulse signal periodically transmitted as a third waveform different from the first waveform and the second waveform.

10. The electronic device of claim 9, wherein the display driver circuit includes a graphic random access memory (GRAM), and wherein the control command comprises a control command indicating to store an image in the GRAM and/or a control command indicating to change a refresh rate of an image to be displayed on the display panel.

11. An electronic device comprising:

at least one processor comprising processing circuitry;

a display including display driver circuitry and a display panel;

a first path, connecting the display driver circuitry to the at least one processor, configured to transmit an image from the at least one processor to the display driver circuitry; and a second path, connecting the display driver circuitry to the at least one processor, separated from the first path, wherein the instructions, when executed by the at least one processor individually or collectively, cause the electronic device to:

periodically transmit, via the second path, from the at least one processor to the display driver circuitry, a pulse signal to synchronize counting of the at least one processor performed for displaying an image on the display panel; with counting of the display driver circuitry performed for displaying an image on the display panel;

identify a control command to be provided to the display driver circuit with respect to the display of the image on the display panel;

based on the identification, provide the control command to the display driver circuitry by changing a waveform of the pulse signal periodically transmitted from a first waveform to a second waveform different from the first waveform;

based on providing the control command to the display driver circuitry, restore the waveform of the pulse signal periodically transmitted to the first waveform.

12. The electronic device of claim 11, wherein the display driver circuit includes a graphic random access memory (GRAM), and wherein the control command comprises a control command indicating storing an image in the GRAM.

13. The electronic device of claim 11, wherein the control command comprises a control command indicating changing a refresh rate of an image to be displayed on the display panel.

14. The electronic device of claim 11, wherein the first path is configured to be disabled in at least portion of a time period that ceases to transmit an image from the at least one processor to the display driver circuitry, and wherein the instructions, when executed by the at least one processor individually or collectively, cause the electronic device to maintain the pulse signal periodically transmitted via the second path from the at least one processor to the display driver circuitry, while the first path is disabled.

15. The electronic device of claim 11, wherein the display driver circuit includes a graphic random access memory (GRAM), wherein the first path is configured to be disabled in at least portion of a time period that executes displaying on the display panel by scanning, by the display driver circuitry, an image stored in the GRAM, and wherein the instructions, when executed by the at least one processor individually or collectively, cause the electronic device to maintain, while the first path is disabled, the pulse signal periodically transmitted via the second path from the at least one processor to the display driver circuitry.

16. The electronic device of claim 11, wherein the instructions, when executed by the at least one processor individually or collectively, cause the electronic device to:

in response to a start timing of a first synchronization signal for the at least one processor being identified as not overlapping a start timing of a second synchronization signal for the at least one processor in accordance with the counting of the at least one processor, set the waveform of the pulse signal periodically transmitted as the first waveform; and in response to a start timing of the first synchronization signal for the at least one processor being identified as overlapping a start timing of the second synchronization signal for the at least one processor in accordance with the counting of the at least one processor, set the waveform of the pulse signal periodically transmitted as a third waveform different from the first waveform and the second waveform, and wherein a cycle of the first synchronization signal for the at least one processor is shorter than a cycle of the second synchronization signal for the at least one processor.

17. The electronic device of claim 16, wherein the display driver circuitry is configured to:

based on the waveform of the pulse signal periodically transmitted from the at least one processor to the display driver circuitry being identified as the first waveform, synchronize the first synchronization signal for the display driver circuitry with the first synchronization signal for the at least one processor; and based on the waveform of the pulse signal periodically transmitted from the at least one processor to the display driver circuitry being identified as the third waveform, synchronize the second synchronization signal for the display driver circuitry with the second synchronization signal for the at least one processor.

18. The electronic device of claim 17, wherein the first synchronization signal for the at least one processor comprises a horizontal synchronization signal for the at least one processor, and wherein the second synchronization signal for the at least one processor comprises a vertical synchronization signal for the at least one processor.

19. The electronic device of claim 18, wherein the control command is provided before a start timing of the vertical synchronization signal for the at least one processor used for displaying an image to which the control command is to be applied.

20. An electronic device comprising:

at least one processor comprising processing circuitry;

memory comprising one or more storage media storing instructions;

a display including display driver circuitry and a display panel;

a first path, connecting the display driver circuitry to the at least one processor, configured to transmit an image from the at least one processor to the display driver circuitry; and a second path, connecting the display driver circuitry to the at least one processor, separated from the first path, wherein the instructions, when executed by the at least one processor individually or collectively, cause the electronic device to:

periodically transmit, via the second path, from the at least one processor to the display driver circuitry, a pulse signal to synchronize counting of the at least one processor performed for displaying an image on the display panel with counting of the display driver circuitry performed for displaying an image on the display panel, wherein a transmission cycle of the pulse signal periodically transmitted corresponds to a cycle of a first synchronization signal for the at least one processor;

based on a start timing of the first synchronization signal for the at least one processor being identified as not overlapping a start timing of a second synchronization signal for the at least one processor in accordance with the counting of the at least one processor, maintain a waveform of the pulse signal periodically transmitted as a first waveform; and based on a start timing of the first synchronization signal for the at least one processor being identified as overlapping a start timing of the second synchronization signal for the at least one processor in accordance with the counting of the at least one processor, change the waveform of the pulse signal periodically transmitted to a second waveform different from the first waveform.

* * * * *